Figure 1:
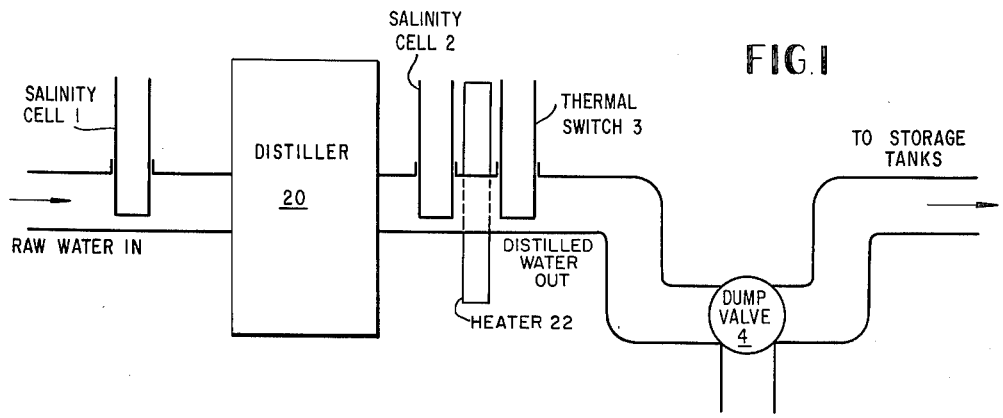

Feb. 15, 1966  H. G. PARKE  3,235,469

WATER PURITY METERING SYSTEMS

Filed May 22, 1962

INVENTOR.
HARRY G. PARKE
BY
*Imirie и Smiley*
ATTORNEYS

United States Patent Office 3,235,469
Patented Feb. 15, 1966

3,235,469
WATER PURITY METERING SYSTEMS
Harry G. Parke, Brooklyn, N.Y., assignor to Marine Electric Corporation, Brooklyn, N.Y., a corporation of New York
Filed May 22, 1962, Ser. No. 196,827
4 Claims. (Cl. 203—2)

This invention relates generally to water purity metering systems and more particularly to means of protecting the output of distillers, principally those aboard ships used to manufacture water for drinking and other purposes, from contamination by bacteria contained in the raw water input.

It is known that if the distiller is operated properly only water vapor and no liquid water is transmitted between the input and output of the distiller, and no bacteria will be transferred. If, however, the distiller is operated incorrectly drops of liquid water may be carried over with the vapor, and these drops will carry such bacteria as were in the raw water input. Any dissolved salts in the raw water will also be carried over with the water droplets, but not if the distiller is operating correctly and only vapor is being transmitted between input and output. When the raw water consists of sea water, with about 35 parts per thousand dissolved salts, faulty operation of the distiller can be detected readily by the presence of a portion of these salts in the distiller output. It is, therefore, general U.S. shipboard practice to install a salinity cell in the output pipe line of all potable water distillers, and to have the reading of the salinity cell control a "dump valve" which will reject the distiller output whenever the output salinity exceeds one quarter grain per gallon.

When the raw water input to the distiller is fresh or brackish, however, as may happen when a ship sails into the mouth of a river, any water drops carried over will contain much less salt and the salinity cell therefore will no longer be adequate warning against liquid carryover and consequent possible bacterial contamination. In such cases good practice calls for heating all the input or all the product water to at least 165° F. to kill any bacteria which may be present.

Personnel operating shipboard distillers are often not aware of the salinity of the raw water input and may not take the proper actions to protect the health of the water users. Some ships, therefore, heat the distiller output water continuously and in addition to the salinity cell in the distiller product line, use a thermostatic switch in the same line arranged to "dump" the product if either its salinity exceeds one quarter grain per gallon or its temperature is less than 165° F. This procedure is economically unsound since a great deal of fuel must be used to heat the output water, unnecessarily most of the time.

The primary object of the present invention is to permit economical operation of a distiller without product heating whenever possible as when the input is salt water and the distiller is operating properly, but provide for product heating only when fresh or brackish input makes it necessary.

Figure 2:
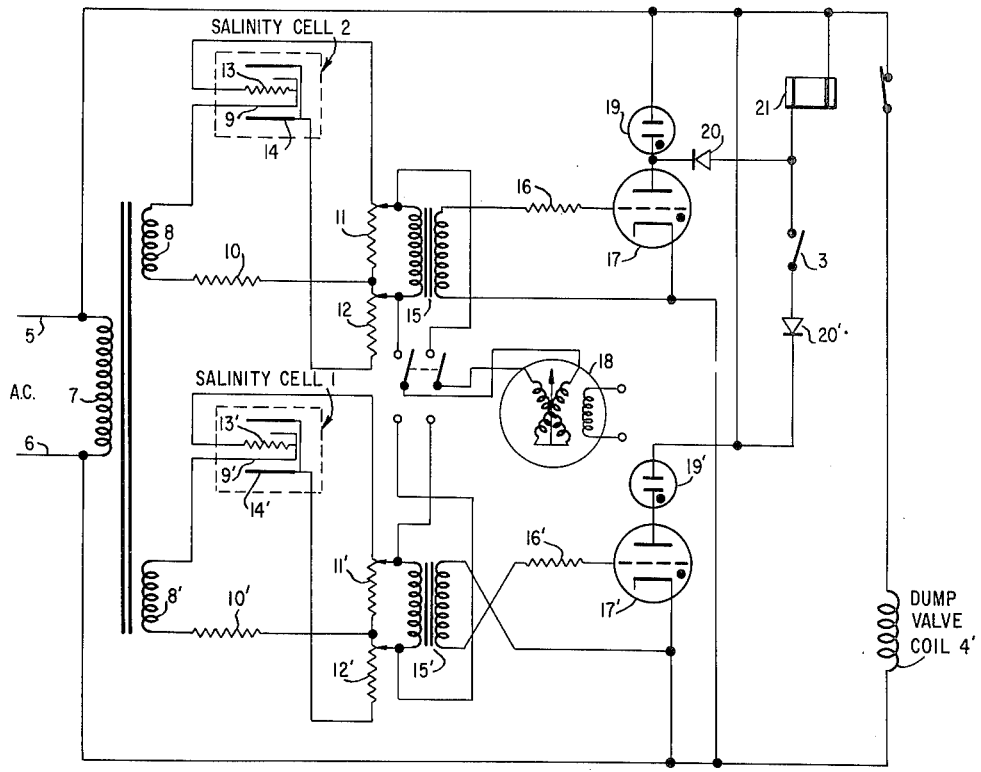

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

FIG. 1 is a diagram showing the physical location of units in the distiller feed and product lines; and
FIG. 2 is a schematic circuit diagram showing the electrical connections of the system parts.

Referring now more particularly to the drawing, FIG. 1 shows a salinity cell 1 installed in the feed conduit to a distiller 20. This is not present practice but constitutes a part of the invention. In the output conduit of the distiller is located a salinity cell 2 and a thermostatic switch 3. A dump valve 4, preferably located in a low point of the output conduit, will, if open, prevent the water from the distiller from going into the storage tanks.

Referring now to FIG. 2, alternating current voltage from lines 5 and 6 is applied to the primary of isolation transformer 7. From the secondary 8 of transformer 7 voltage is applied to the inner electrode 9 of salinity cell 2. The other end of secondary 8 is connected through current limiting resistor 10 to the junction of potentiometers 11 and 12. The outer end of potentiometer 11 is connected to the temperature compensating resistor 13 of cell 2, and the outer end of potentiometer 12 is connected to the outer electrode 14 of cell 2. The taps on potentiometers 11 and 12 are connected to the primary of a step up transformer 15, the secondary of which is connected through current limiting resistor 16 to the grid of thyratron 17. What has been described thus far is a currently used circuit and it will be understood by those familiar with the art that the ratio of voltages across 11 and 12 will be proportional to the salinity of the water being sampled by cell 2. The setting of the taps on 11 and 12 determines the value of this ratio at which the voltage picked up by transformer 15 will pass through a null and change phase 180°.

For the purpose of reading salinity, a ratio meter 18 is provided, the two crossed coils of which may be switched across the taps of potentiometers 11 and 12. For alarming, thyratron 17 derives its plate-cathode excitation from the A.C. source 5, 6. The thyratron 17 has characteristics such that when the grid voltage is in phase with the plate voltage the tube will fire and appear as a low impedance, between plate and cathode; when the grid voltage is out of phase an open circuit exists between plate and cathode.

From the above it will be seen that thyratron 17 will fire when the salinity at cell 2 exceeds the value determined by the setting of the arms of 11 and 12. An alarm lamp 19, usually red, and connected in the plate circuit will then light. Current will also flow through an isolating diode 20 and energize relay 21 opening its normally closed contact and the circuit to the dump valve coil 4' causing the dump valve to reject the distillate. In FIG. 2 it is assumed that the dump valve is of the usual type, requiring electric power to hold it in against a spring.

The invention requires another salinity cell 1 installed in the feed line to the distiller. This cell must, of course, have a much higher cell constant than cell 2. The circuitry and components associated with cell 1 are almost identical with those associated with cell 2 and, therefore, are given the same reference numerals primed in FIG. 2. The important difference is that the secondary of transformer 15' has its connections reversed from those of transformer 15; therefore thyratron 17' will fire on decreasing rather than increasing salinity at cell 1.

It is apparent that meter 18 may also be used to read the salinity at 1 (by use of a dual scale or scale factor), thereby effecting a considerable economy.

When thyratron 17' fires it will light lamp 19', which is preferably colored yellow, and cause electron current to flow through diode 20' toward relay 21. Since dumping should not take place, even with low salinity input if the product water is heated to 165° F., diode 20' is in series with the contacts of the thermostatic switch 3 in the product line, which contacts are open when the product temperature is above 165° F., and closed when below. Thus dumping will take place whenever either the product salinity is high, or both the feed salinity is low and the product temperature is below 165° F., which is the desired result.

It will be apparent to those skilled in the art that many changes can be made without deviating from the spirit of my invention. For example, separate relays could be used in each thyratron plate circuit with their contacts operating the dump relay 21 instead of it being operated directly from the tube plates. Means may obviously be employed operated as for example by reduced salinity in the distilled feed line and firing of thyratron 17' to energize a heater 22 for heating the distiller product. Such heater can be then thermostatically or manually controlled to heat and maintain a selected range of temperatures in the distiller product line. The invention, therefore, is not to be restricted except insofar as is necessitated by the prior art and by the spirit of the appended claims.

What is claimed is:

1. Apparatus for ensuring the purity of a water distillate, comprising a distiller having a feed conduit and an output conduit, a first salinity cell located in said feed conduit, a second salinity cell and a temperature sensor located in said output conduit, data converting means including a source of A.C. potential connected to both the said salinity cells, first and second potentiometers respectively connected in series with said first and second cells, first and second transformers having primary windings respectively connected across said first and second potentiometers, and first and second thyratrons having their grids respectively connected to the secondary windings of said first and second transformers with the secondary winding of said first transformer reversed so as to yield electrical signals indicating decreasing and increasing salinity respectively for said first and second cells, and means operatively connected to said data converting means and temperature sensor for dumping the distiller product water from said output conduit when the product water salinity exceeds a first preset value and also when both the feed water salinity is below a second preset value and the product water temperature is below a preset value, said means for dumping including a dumping relay connected in the plate circuits of both said thyratrons, and a switch operated by said temperature sensor in series with said dumping relay and the plate of said first thyratron.

2. Apparatus for ensuring the purity of a water distillate comprising a distiller having a feed conduit and an output conduit for product water, a first salinity cell located in said feed conduit for measuring salinity of feed water, a second salinity cell and a temperature sensor located in said output conduit, data converting means reversely connecting said first and second cells to yield electrical signals of opposite polarity indicating decreasing and increasing salinity respectively of the feed and product water as their salinity rises, and means operatively connected to said data converting means and temperature sensor for dumping the product water from said output conduit when the product water salinity increases to and exceeds a first preset value and also when both the feed water salinity decreases to and below a second preset value and the product water temperature is below a preset value.

3. Apparatus for ensuring the purity of a water distillate comprising a distiller having a feed conduit and an output circuit for product water, a first salinity cell located in said feed conduit for measuring salinity of feed water, a second salinity cell and a temperature sensor located in said output conduit, data converting means reversely connecting said first and second cells to yield electrical signals of opposite polarity indicating decreasing and increasing salinity respectively of the feed and product water as their salinity rises, and means operatively connected to said data converting means and temperature sensor for indicating an alarm when the product water salinity in the output conduit increases to and exceeds a first preset value and also when both the feed water salinity decreases to and below a second preset value and the product water temperature is below a preset value.

4. A method for protecting the purity of water in a distilling process comprising feeding raw water to a distiller, feeding the distilled product water toward storage tanks, continuously measuring the salinity of said raw water and said distilled output water independently of each other and continuously measuring the temperature of said output water, heating said output water to a temperature of at least 165° F. only if the measured salinity of said raw water is less than a first preselected value, and dumping the output water prior to storage also when the measured salinity of the distilled output water exceeds a second preselected value and when both the measured salinity of the raw water is less than said first preselected value and the temperature of the distillate output water is below approximately 165° F.

References Cited by the Examiner

UNITED STATES PATENTS

| | | | |
|---|---|---|---|
| 1,121,393 | 12/1914 | Patten | 210—149 X |
| 1,145,509 | 7/1915 | Pike et al. | 324—30 X |
| 2,146,312 | 2/1939 | Powell et al. | 324—30 |
| 2,439,354 | 4/1948 | Wolcott | 324—30 X |
| 2,470,153 | 5/1949 | Feller. | |
| 2,513,901 | 7/1950 | Thompson. | |
| 2,613,177 | 10/1952 | Worthen et al. | 202—174 |
| 2,711,995 | 6/1955 | Sard | 324—30 X |
| 2,764,892 | 10/1956 | Rosenthal. | |
| 2,798,215 | 7/1957 | Domingo et al. | |
| 2,838,378 | 6/1958 | Shawhan | 324—30 X |
| 2,950,176 | 8/1960 | Thayer et al. | 324—30 X |
| 2,960,449 | 11/1963 | Williamson. | |
| 3,074,216 | 1/1963 | Loebel | 202—153 X |

NORMAN YUDKOFF, *Primary Examiner.*

HERBERT L. MARTIN, *Examiner.*